(12) United States Patent
Sollee

(10) Patent No.: US 8,484,359 B2
(45) Date of Patent: *Jul. 9, 2013

(54) PROVIDING TELEPHONY SERVICES TO TERMINALS BEHIND A FIREWALL AND/OR A NETWORK ADDRESS TRANSLATOR

(75) Inventor: Patrick N. Sollee, Richardson, TX (US)

(73) Assignee: Rockstar Consortium US LP, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/584,105

(22) Filed: Aug. 13, 2012

(65) Prior Publication Data

US 2012/0311163 A1 Dec. 6, 2012

Related U.S. Application Data

(63) Continuation of application No. 11/601,394, filed on Nov. 17, 2006, now Pat. No. 8,244,876, which is a continuation of application No. 09/881,594, filed on Jun. 14, 2001, now abandoned.

(51) Int. Cl.
*G06F 15/16* (2006.01)

(52) U.S. Cl.
USPC ............ 709/227; 709/206; 709/224; 709/230

(58) Field of Classification Search
USPC .................................. 709/206, 224, 227, 230
See application file for complete search history.

(56) References Cited

U.S. PATENT DOCUMENTS

| | | | |
|---|---|---|---|
| 5,727,146 A | 3/1998 | Savoldi et al. | |
| 5,826,016 A | 10/1998 | Ito et al. | |
| 6,058,431 A | 5/2000 | Srisuresh et al. | |
| 6,128,298 A | 10/2000 | Wooton et al. | |
| 6,219,706 B1 | 4/2001 | Fan et al. | |
| 6,233,245 B1 | 5/2001 | Chapman et al. | |

(Continued)

FOREIGN PATENT DOCUMENTS

| | | |
|---|---|---|
| EP | 1130846 A2 | 9/2001 |
| WO | 9740610 A2 | 10/1997 |

(Continued)

OTHER PUBLICATIONS

Information Science Institute, Request for Comments 791, Internet Protocol, DARPA Internet Program Protocol Specification, Sep. 1981, pp. 1-51.

(Continued)

*Primary Examiner* — Yves Dalencourt
(74) *Attorney, Agent, or Firm* — Withrow & Terranova, PLLC

(57) ABSTRACT

A method and apparatus for allowing telephony or other types of media communications and services to be provided for a device (24) having a private network address that resides behind a firewall and network address and port translation (NAPT) module (which is unaware of the underlying protocol for the communications and services). Examples of the underlying protocol includes the Session Initiation Protocol (SIP) and Real-Time Protocol (RTP). A path through the firewall and NAPT module is defined by use of keep-alive messages communicated through the firewall and NAPT module. Addresses that are allocated by the firewall and NAPT module are associated with the device (24) for both signaling and media communications. A feature of the firewall that enables the provision of telephony and media communications through the firewall that is protocol-unaware is that the firewall allows responses to messages initiated by the device back through the firewall.

20 Claims, 6 Drawing Sheets

U.S. PATENT DOCUMENTS

| | | | |
|---|---|---|---|
| 6,307,845 B1 | 10/2001 | Hummelgren et al. | |
| 6,331,984 B1 | 12/2001 | Luciani | |
| 6,381,646 B2 | 4/2002 | Zhang et al. | |
| 6,389,462 B1 | 5/2002 | Cohen et al. | |
| 6,396,833 B1 | 5/2002 | Zhang et al. | |
| 6,427,174 B1 | 7/2002 | Sitaraman et al. | |
| 6,510,154 B1 | 1/2003 | Mayes et al. | |
| 6,608,830 B1 | 8/2003 | Hirano et al. | |
| 6,636,898 B1 | 10/2003 | Ludovici et al. | |
| 6,650,641 B1 | 11/2003 | Albert et al. | |
| 6,654,882 B1 | 11/2003 | Froutan et al. | |
| 6,697,354 B1 | 2/2004 | Borella et al. | |
| 6,697,377 B1 | 2/2004 | Ju et al. | |
| 6,731,642 B1 | 5/2004 | Borella et al. | |
| 6,744,767 B1 | 6/2004 | Chiu et al. | |
| 6,771,674 B1 | 8/2004 | Schuster et al. | |
| 6,822,957 B1 | 11/2004 | Schuster et al. | |
| 6,829,239 B1 | 12/2004 | Bhatia et al. | |
| 6,880,089 B1 | 4/2005 | Bommareddy et al. | |
| 6,892,245 B1 | 5/2005 | Crump et al. | |
| 6,928,082 B2 | 8/2005 | Liu et al. | |
| 6,944,673 B2 | 9/2005 | Malan et al. | |
| 6,957,346 B1 | 10/2005 | Kivinen et al. | |
| 7,042,876 B1 | 5/2006 | Jayasenan et al. | |
| 7,068,655 B2 | 6/2006 | March et al. | |
| 7,146,410 B1 | 12/2006 | Akman | |
| 7,171,473 B1 | 1/2007 | Eftis et al. | |
| 7,272,650 B2 | 9/2007 | Elgebaly et al. | |
| 7,406,713 B2 | 7/2008 | Sheymov et al. | |
| 7,797,433 B2 | 9/2010 | Kennedy et al. | |
| 7,814,208 B2 | 10/2010 | Stephenson et al. | |
| 7,830,870 B2 | 11/2010 | Kuo et al. | |
| 8,244,876 B2 * | 8/2012 | Sollee | 709/227 |
| 2002/0023143 A1 | 2/2002 | Stephenson et al. | |
| 2002/0037723 A1 | 3/2002 | Roach | |
| 2002/0042832 A1 | 4/2002 | Fallentine et al. | |
| 2002/0078198 A1 | 6/2002 | Buchbinder et al. | |
| 2002/0114319 A1 | 8/2002 | Liu et al. | |
| 2002/0120760 A1 | 8/2002 | Kimchi et al. | |
| 2002/0122416 A1 | 9/2002 | Xu et al. | |
| 2002/0159447 A1 | 10/2002 | Carey et al. | |
| 2002/0169842 A1 | 11/2002 | Christensen et al. | |
| 2002/0184316 A1 | 12/2002 | Thomas et al. | |
| 2003/0009534 A1 | 1/2003 | Yamagishi | |
| 2003/0043740 A1 | 3/2003 | March et al. | |
| 2003/0145093 A1 | 7/2003 | Oren et al. | |
| 2004/0024879 A1 | 2/2004 | Dingman et al. | |
| 2004/0037268 A1 | 2/2004 | Read | |
| 2004/0095937 A1 | 5/2004 | Piche et al. | |
| 2004/0100976 A1 | 5/2004 | Chang et al. | |
| 2004/0153549 A1 | 8/2004 | Naito et al. | |
| 2004/0230688 A1 | 11/2004 | Gbadegesin | |
| 2005/0135359 A1 | 6/2005 | Chang | |
| 2005/0254482 A1 | 11/2005 | Yeom | |
| 2006/0120366 A1 | 6/2006 | Jayasenan et al. | |
| 2006/0288411 A1 | 12/2006 | Garg et al. | |
| 2007/0136480 A1 | 6/2007 | Stephenson et al. | |
| 2007/0192508 A1 | 8/2007 | Sollee | |
| 2008/0075097 A1 | 3/2008 | Kitada | |
| 2008/0168181 A1 | 7/2008 | Berkvens et al. | |
| 2008/0256624 A1 | 10/2008 | Sheymov et al. | |

FOREIGN PATENT DOCUMENTS

| | | |
|---|---|---|
| WO | 9959071 A1 | 11/1999 |
| WO | 0060826 A1 | 10/2000 |
| WO | 0078008 A1 | 12/2000 |
| WO | 0137510 A2 | 5/2001 |
| WO | 0203217 A1 | 1/2002 |
| WO | 0211400 A1 | 2/2002 |
| WO | 02084974 A2 | 10/2002 |

OTHER PUBLICATIONS

Postel, J., Request for Comments 768, "User Datagram Protocol," Aug. 1980, pp. 1-3.

Deering, S. et al., Network Working Group, Request for Comments 2460, "Internet Protocol, Version 6 (IPv6) Specification," Dec. 1998, pp. 1-39.

Shulzrinne, H. et al., Network Working Group, Request for Comments 1889, "RTP: A Transport Protocol for Real-Time Applications," Jan. 1996, pp. 1-74.

Handley, M. et al., Network Working Group, Request for Comments 2543, "SIP: Session Initiation Protocol," Mar. 1999, pp. 1-304.

Arango, M. et al., Network Working Group, Request for Comments 2705, "Media Gateway Control Protocol (MGCP)," Oct. 1999, pp. 1-135.

Rosenberg, J., et al., "SIP Traversal through Residential and Enterprise NATs and Firewalls; draft-rosenberg-sip-entfw-01.txt," IETF Standard-Working Draft, Internet Engineering Task Force (IETF), Mar. 2, 2001.

Schulzrinne, H. et al., "The Session Initiation Protocol: Internet-Centric Signaling," IEEE Communications Magazine, IEEE Service Center, Piscataway, vol. 38, No. 10, Oct. 2000, 8 pages.

Thernelius, F. et al., et al., "SIP Firewall Solution; draft-thernelius-sip-firewall-solution-00.txt," IETF Standard-Working Draft, IETF, CH, Jul. 2000, XP 015036105, 32 pages.

Non-Final Rejection issued Feb. 18, 2009, for U.S. Appl. No. 09/881,604, 10 pages.

Final Rejection issued Oct. 29, 2007, for U.S. Appl. No. 09/881,604, 14 pages.

Non-Final Rejection issued May 17, 2007, for U.S. Appl. No. 09/881,604, 12 pages.

Non-Final Rejection issued Nov. 1, 2006, for U.S. Appl. No. 09/881,604, 12 pages.

Final Rejection issued Jul. 14, 2006, for U.S. Appl. No. 09/881,604, 10 pages.

Non-Final Rejection issued Jan. 12, 2006, for U.S. Appl. No. 09/881,604, 12 pages.

Non-Final Rejection issued Jun. 28, 2005, for U.S. Appl. No. 09/881,604, 8 pages.

Non-Final Rejection issued Dec. 2, 2004, for U.S. Appl. No. 09/881,604, 6 pages.

Final Rejection issued Jul. 9, 2009, for U.S. Appl. No. 11/592,775, 11 pages.

Non-Final Rejection issued Dec. 16, 2008, for U.S. Appl. No. 11/592,775, 12 pages.

Marshall, W. et al., "SIP Extensions for Caller Identity and Privacy," Internet Engineering Task Force Internet Draft, May 2001, pp. 1-24.

Notice of Allowance issued Mar. 3, 2006, for U.S. Appl. No. 09/881,595, 2 pages.

Notice of Allowance issued Nov. 17, 2005, for U.S. Appl. No. 09/881,595, 4 pages.

Final Rejection issued Jul. 12, 2005, for U.S. Appl. No. 09/881,595, 7 pages.

Non-Final Rejection issued Dec. 15, 2004, for U.S. Appl. No. 09/881,595, 12 pages.

European Search Report issued Apr. 15, 2008, for European Patent Application No. 08102106.5, 7 pages.

Examination Report issued Dec. 23, 2008, for European Patent Application No. 08102106.5, 9 pages.

Non-Final Rejection issued Nov. 5, 2004, for U.S. Appl. No. 09/881,594, 13 pages.

Election/Restriction Requirement issued Apr. 29, 2005, for U.S. Appl. No. 09/881,594, 6 pages.

Non-Final Rejection issued Jul. 20, 2005, for U.S. Appl. No. 09/881,594, 9 pages.

Final Rejection issued Jan. 18, 2006, for U.S. Appl. No. 09/881,594, 15 pages.

Examiner's Answer issued Aug. 8, 2006, for U.S. Appl. No. 09/881,594, 15 pages.

Examiner's Answer issued Sep. 21, 2006, for U.S. Appl. No. 09/881,594, 14 pages.

Board of Patent Appeals and Interferences Decision on Appeal issued Jul. 31, 2007, for U.S. Appl. No. 09/881,594, 12 pages.

Non-Final Rejection issued Dec. 29, 2008, for U.S. Appl. No. 11/601,394, 11 pages.

Non-Final Rejection issued Jun. 9, 2009, for U.S. Appl. No. 11/601,394, 12 pages.

Final Rejection issued Feb. 4, 2010, for U.S. Appl. No. 11/601,394, 14 pages.

Non-Final Rejection issued Aug. 31, 2010, for U.S. Appl. No. 11/601,394, 12 pages.
Final Rejection issued Feb. 15, 2011, for U.S. Appl. No. 11/601,394, 17 pages.
Final Rejection issued Sep. 4, 2009, for U.S. Appl. No. 11/788,581, 10 pages.
Non-Final Rejection issued Mar. 4, 2009, for U.S. Appl. No. 11/788,581, 7 pages.
Non-Final Rejection issued May 12, 2010, for U.S. Appl. No. 11/788,581, 11 pages.
Final Rejection issued Nov. 23, 2010, for U.S. Appl. No. 11/788,581, 13 pages.
Notice of Allowance issued Apr. 11, 2011, for U.S. Appl. No. 11/788,581, 6 pages.
International Search Report issued Jul. 4, 2003, for PCT/US02/18124, 7 pages.
Non-Final Rejection issued Aug. 30, 2011, for U.S. Appl. No. 11/601,394, 15 pages.
Notice of Allowance issued Oct. 4, 2011, for U.S. Appl. No. 11/788,581, 5 pages.
Notice of Allowance issued Apr. 4, 2012, for U.S. Appl. No. 11/601,394, 8 pages.
Non-Final Rejection issued Mar. 4, 2010, for U.S. Appl. No. 11/592,775, 12 pages.
Notice of Allowance issued Jan. 4, 2011, for U.S. Appl. No. 11/592,775, 7 pages.

* cited by examiner

PROVIDING TELEPHONY SERVICES TO TERMINALS BEHIND A FIREWALL AND/OR A NETWORK ADDRESS TRANSLATOR

CROSS-REFERENCES TO RELATED APPLICATIONS

This application is a continuation of U.S. patent application Ser. No. 11/601,394, filed on Nov. 17, 2006, entitled PROVIDING TELEPHONE SERVICES TO TERMINALS BEHIND A FIREWALL AND/OR A NETWORK ADDRESS TRANSLATOR, which issued on Aug. 14, 2012, as U.S. Pat. No. 8,244,876, and which claims priority to previously filed U.S. patent application Ser. No. 09/881,594, filed on Jun. 14, 2001, entitled PROVIDING TELEPHONY SERVICES TO TERMINALS BEHIND A FIREWALL AND/OR NETWORK ADDRESS TRANSLATOR, each of which is hereby incorporated herein by reference in its entirety.

TECHNICAL FIELD

The invention relates generally to providing telephony services to terminals behind a firewall and/or a network address translator.

BACKGROUND

Various forms of communications can be performed in packet-based networks, such as electronic mail, web browsing, file transfer, and so forth. With the increased capacity and reliability of packet-based networks, voice communications (along with other forms of real-time, interactive communications) have also become feasible. In such communications, voice and other real-time data are carried in packets that are sent across the network.

Standards have been proposed for voice and multimedia communications over packet-based networks. One such standard is the H.323 Recommendation from the International Telecommunication Union (ITU). Another standard for voice and multimedia communications is the Session Initiation Protocol (SIP), as developed by the Internet Engineering Task Force (IETF). Generally, H.323, SIP, and other control protocols are used for negotiating session information to coordinate the establishment of a call session. Once negotiation setup has been completed, packetized media (including voice or other forms of real-time data) can flow between endpoints. A media transport protocol, such as the Real-Time Protocol (RTP), is used for conveying packetized media between the endpoints.

Various issues are associated with communications over packet-based networks. One is the dwindling supply of network addresses, such as Internet Protocol (IP) addresses. To address this problem, network address translation (NAT) is provided to enable address translations between public and private networks. By reusing a pool of private addresses in different private networks, the virtual supply of network addresses is extended. Another concern of packet-based communications is security. Once a network address of a specific node is known, this network address can be used as routing information to gain illegal access to the node and all of its resources. Network address translation can be used to hide network addresses of nodes to protect such nodes.

Also, to prevent unauthorized access of a private network, a firewall is placed between the private network and a public network. Thus, in a typical arrangement, nodes and terminals on a private network are connected behind a node that includes both a firewall and a network address translator (NAT). Collectively, such a node can be referred to as a "firewall and NAT module" or "firewall and NAT device."

Generally, to offer telephony services to terminals or clients that reside behind a firewall and NAT module, some modification typically is needed of the firewall software. One issue is that a firewall does not allow unsolicited connections from a system or device outside a private network to nodes or devices on the private network. Another issue is that, because of the presence of a NAT, a network address allocated to a terminal (for communicating bearer traffic packets) by the NAT is not known until the network address translation actually occurs. Note that the address used by the terminal for call session setup signaling (control signaling) may be different for the address used for communication of bearer traffic packets (carrying telephony media such as voice). This is because a NAT typically dynamically assigns addresses on an as-needed basis after a call session has been established and bearer traffic packets are actually communicated. A need thus exists for an improved method and apparatus of providing telephony services to terminals or systems behind a firewall and NAT.

SUMMARY

In general, according to one embodiment, a device capable of being used in communications through a firewall and network address translator includes an interface adapted to exchange messages with a node on another side of the firewall and network address translator. The exchange of messages is initiated by the device, which is behind the firewall and network address translator. The exchange of messages between the device and the node results in creation of a path through the firewall and network address translator. A controller is adapted to repeatedly send keep-alive messages to maintain the path through the firewall and network address translator.

In general, according to another embodiment, a system for use in communications between a first terminal and a second terminal, with the first terminal coupled to a remote network address translator, includes an interface adapted to communicate with the remote network address translator. The system further includes a storage module to store network address translation information for the first terminal. A controller is adapted to partially create the network address translation information during setup of a communications session between the first and second terminals and to wait for a media packet originated by the first terminal after the communications session has been set up to complete the network address translation information.

Some embodiments of the invention may have one or more of the following advantages. By maintaining a path through a firewall and network address translator, the path can be used for control signaling communicated from outside a private network to a terminal behind the firewall and network address translator to establish communications sessions (e.g., call sessions). Using techniques according to some embodiments, substantial modification of the firewall and network address translator can be avoided. As a result, the firewall does not need to be aware of the underlying protocol used for the communications session.

Other features and advantages will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
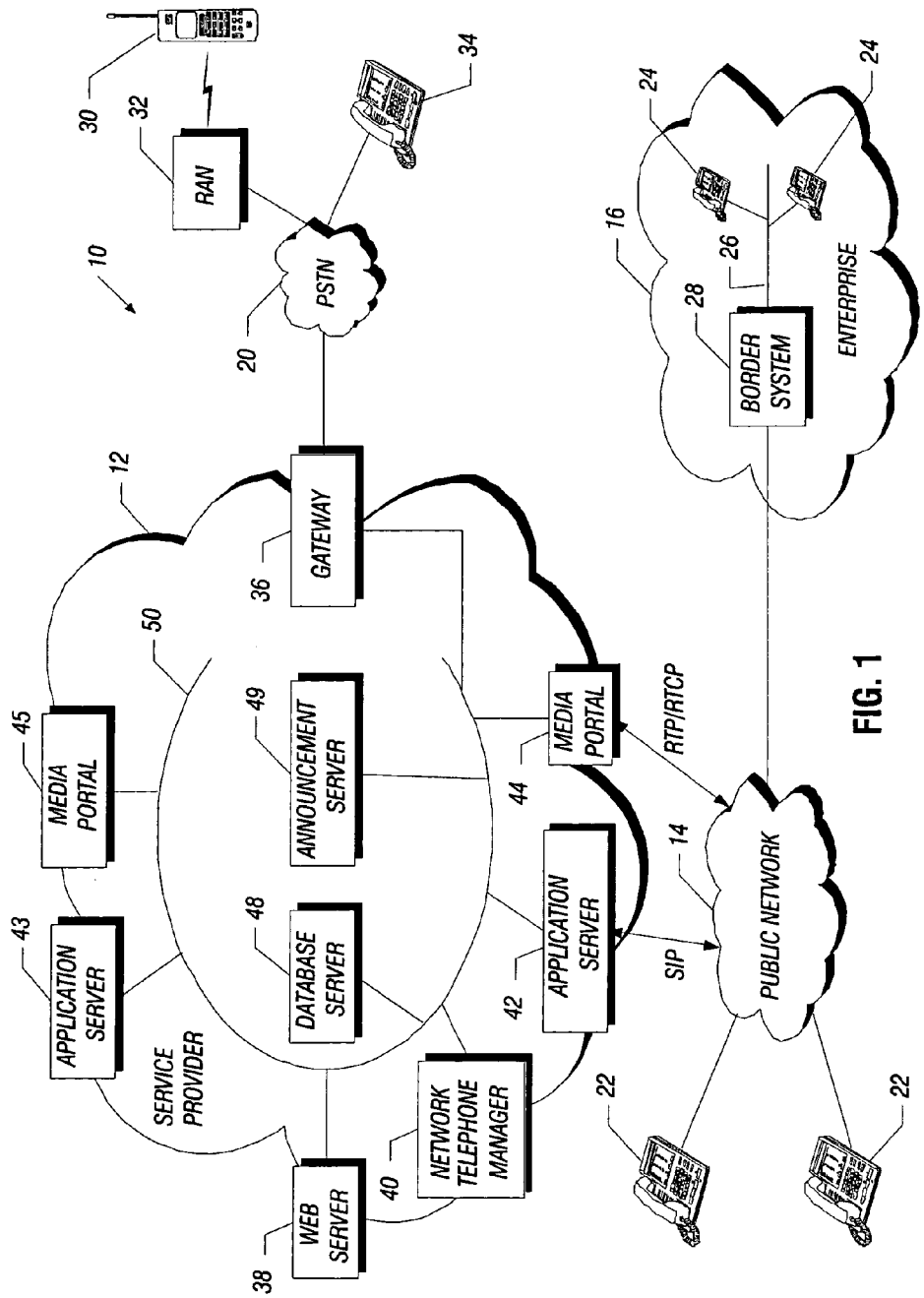
FIG. 1 is a block diagram of an example communications system that incorporates an embodiment of the invention.

Referring to FIG. 1, a communications system 10 includes a public network (e.g., the Internet) 14, an enterprise 16 (e.g., a company, a government agency, a university, or other organization of multiple users), a service provider 12, and a public switched telephone network (PSTN) 20. The arrangement of FIG. 1 is shown for purposes of illustration and example, as other embodiments can have other arrangements.

The service provider 12 includes a private network 50 coupled to various internal nodes, and the enterprise 16 includes a private network 26 coupled to various internal nodes and terminals. The service provider 12 enables access by subscribers of various resources in the communications system 10, including the public network 14 and the PSTN 20. Thus, a user station coupled to the public network 14, such as one of user stations 22 or one of user stations 24 in the enterprise 16, can perform various forms of communications through the service provider 12. Examples of possible communications include real-time, interactive communications (e.g., voice, video conferencing, interactive electronic gaming, file transfer, whiteboarding, and so forth). Interactive electronic gaming refers to a session in which data associated with an electronic game (e.g., chess) is exchanged between two or more players over a network. Whiteboarding refers to a session in which notes can be written by participants of the session over a network to a virtual whiteboard.

The user stations 24, which are connected to the enterprise private network 26, communicate with the public network 14 through a border system 28. In one example, the border system 28 includes a firewall and network address and port translation (NAPT) capabilities, which are provided by a firewall device and an NAPT device. The firewall device and NAPT device can be implemented as separate components on separate platforms, or they can be integrated on the same platform. In the ensuing discussion, a firewall device and NAPT device are referred to collectively as a "firewall and NAPT module." However, although referred to in the singular, the firewall and NAPT module can be made up of plural modules (implemented as software, hardware, or a combination thereof) in the border system 28 or in multiple systems. Also, although the discussion refers to features of the firewall and NAPT module, it should be understood that certain features are provided by the firewall portion while other features are provided by the NAPT module. As will be described further below, various issues are associated with provision of telephony services by the service provider 12 to devices behind the firewall and NAPT module.

The user stations 22 and 24 shown in FIG. 1 can be network telephones (which are telephones including a network interface to enable communication with a packet-based network), computers fitted with voice processing capabilities (referred to as "softphones"), or other terminals capable of participating in real-time, interactive communications sessions. One example of a network telephone is the i2004 telephone from Nortel Networks. Examples of other user stations that can be endpoints of communications sessions include mobile stations 30 coupled by wireless links to a radio access network (RAN) 32, which is in turn connected to the PSTN 20. Also, a wired telephony device 34 can be coupled to the PSTN 20.

The service provider 12 includes various components that are visible on the public network 14, including a web server 38, a network telephone manager 40, application servers 42 and 43, and media portals 44 and 45. The service provider 12 also includes internal nodes that are not visible to the public network 14, including a gateway 36 to the PSTN 20, a database server 48, an announcement server 49, and other nodes (not shown). The gateway 36 translates between call control signaling and media according to a first format (e.g., packet-based format) used on the public network 14 and another format (e.g., circuit-switched format) used on the PSTN 20. The database server 48 stores information of registered devices, including information relating to which domain the devices are in, and other information.

The web server 38 presents web pages that can be browsed by users on the public network 14. The network telephone manager 40 is used for managing network telephones. The network telephone manager 40 generates and receives call control signaling on behalf of the network telephones. Once a call is established, media is communicated directly between two endpoints (e.g., two network telephones). In other embodiments, the network telephones may be capable of exchanging and processing call control signaling without the assistance of the network telephone manager 40.

The application server 42 or 43 communicates call control signaling with stations or nodes on the public network 14 or on the private network 50 for establishing a call. Once the call is established, media and/or bearer traffic is communicated through the media portal 44 or 45 between endpoints. In one embodiment, the media packets can contain Real-Time Protocol (RTP) data that are carried within a User Datagram Protocol (UDP)/Internet Protocol (IP) packet.

In one example, call control signaling for establishing a call session is according to a Session Initiation Protocol (SIP). SIP is part of the multimedia data and control architecture from the IETF, and one version of SIP is described in Request for Comments (RFC) 2543, entitled "SIP: Session Initiation Protocol," dated 1999. SIP can be used to initiate call sessions as well as to invite members to a session that may have been advertised by some other mechanism, such as electronic mail, web pages, and so forth. RTP, which defines a protocol for transporting real-time data, is described in RFC 1889 entitled "RTP: A Transport Protocol for Real-Time Applications," dated January 1996. UDP defines a transport layer that is described in RFC 768, entitled "User Datagram Protocol," dated August 1980. One version of IP is described in RFC 791, entitled "Internet Protocol," dated September 1981, while another version of IP is described in RFC 2460, entitled "Internet Protocol, Version 6 (IPv6) Specification," dated December 1998. Other standards can also be employed to provide call control signaling, such as the H.323 Recommendation from the International Telecommunication Union (ITU).

As used here, a "call session" refers generally to a real-time, interactive communications session that involves the exchange of real-time data between multiple parties. An interactive communications session refers to a session in which two or more parties are involved in an exchange of data. A real-time, interactive communication session refers to an exchange of data, such as audio and/or video data, on a substantially real-time basis between two endpoints. A session is substantially real-time if interaction is occurring between two endpoints with communication from one endpoint followed relatively quickly by a response or another communication from the other endpoint. A "call request" is a message for establishing a call session. A "media packet" or "media data unit" refers to a packet or data unit carrying bearer traffic (e.g., voice data, video data, interactive electronic gaming data, file transfer data, whiteboarding data, etc.) in a call session.

In accordance with some embodiments of the invention, telephony services are provided by the service provider 12 to devices on the enterprise private network 26 without substantial modification of the firewall and NAPT module (referred to as the "enterprise firewall and NAPT module") in the border system 28. An issue associated with providing telephony services to a device behind an enterprise firewall and NAPT module is that the firewall and NAPT module prevents unsolicited access by an external device. Unless a path through the enterprise firewall and NAPT module is opened, the firewall and NAPT module hides the identity (address and port) of the device behind the firewall and NAPT module. Thus, any incoming calls to such a device would be unable to reach the device. To address this issue in accordance with one embodiment of the invention, a path or connection is created and maintained between a device behind the firewall and NAPT module and the application server 42 or 43 (which includes a SIP proxy or other like device). Maintenance of the path is accomplished by using a "keep-alive" signaling mechanism that issues periodic messages between the device and application server 42 or 43, which allows the firewall and NAPT module to maintain allocation of resources (e.g., network address and port) for the call session.

The use of keep-alive messages to maintain the path is needed in some embodiments for two reasons. One is that UDP provides for connectionless communications between two endpoints. Another is that once a message is sent by a device behind an enterprise firewall and NAPT module is sent, the path through the enterprise firewall and NAPT module through which responses can be sent to the device is maintained open for only some preset amount of time. After the preset amount of time, the path is closed.

Another issue associated with creating call sessions with a device behind an enterprise firewall and NAPT module is that the external address and port of the device behind the enterprise firewall and NAPT module allocated for media communications (communications of media packets carrying bearer traffic such as voice) is unknown until the device actually starts sending media packets. This is due to the fact that the enterprise firewall and NAPT module does not allocate an external address and port to the device for media communications until media communications actually start. Note that during call session setup, the enterprise firewall and NAPT module allocates an external address and port to the device for communication of call control signaling—however, the control address and port is different from the media address and port for communication of media packets.

One of the tasks performed by the media portal 44 or 45 is network address and port translation (NAPT) of media packets exchanged during a call session. Note that an NAPT module in the media portal 44 or 45 is separate and distinct from the enterprise firewall and NAPT module. Whereas the enterprise firewall and NAPT module is provided to protect devices on the enterprise private network 26, the NAPT module in the media portal 44 or 45 is provided to hide identities of devices on the service provider private network 50 and to shield identities of endpoints that communicate media packets through the media portal 44 or 45 during a call session. The NAPT module in the media portal 44 or 45 translates both the source and destination addresses (e.g., IP addresses) and ports (e.g., UDP ports) of each received packet. This is a departure from standard network address and port translators, which typically translate only one of the source and destination addresses for a given direction of the media packet.

To perform NAPT, the media portal 44 or 45 maintains an NAPT table that contains information for mapping addresses and ports in media packets. The media portal 44 or 45 is able to partially create NAPT mappings during a call establishment flow, but the media portal 44 or 45 waits until the first media packet arrives from device(s) behind respective firewall and NAPT module(s) before the NAPT mappings can be completed.

Although reference is made to NAPT modules that translate both network addresses and ports, other embodiments may involve translation modules that translate only the network address or only the port. Calls handled through the service provider 12 can involve endpoints that are both located outside the private network 50, such as user stations 22 and/or user stations 24. Alternatively, a call can involve an endpoint outside the service provider private network 50 and a node on the service provider private network 50, such as the gateway 36 or the announcement server 49. Also, although only one enterprise 16 is illustrated in FIG. 1, other arrangements can have plural enterprises with their respective enterprise private networks and firewall and NAPT modules.

The various arrangements described herein are provided as examples only, as other embodiments may utilize other arrangements.

Figure 2:
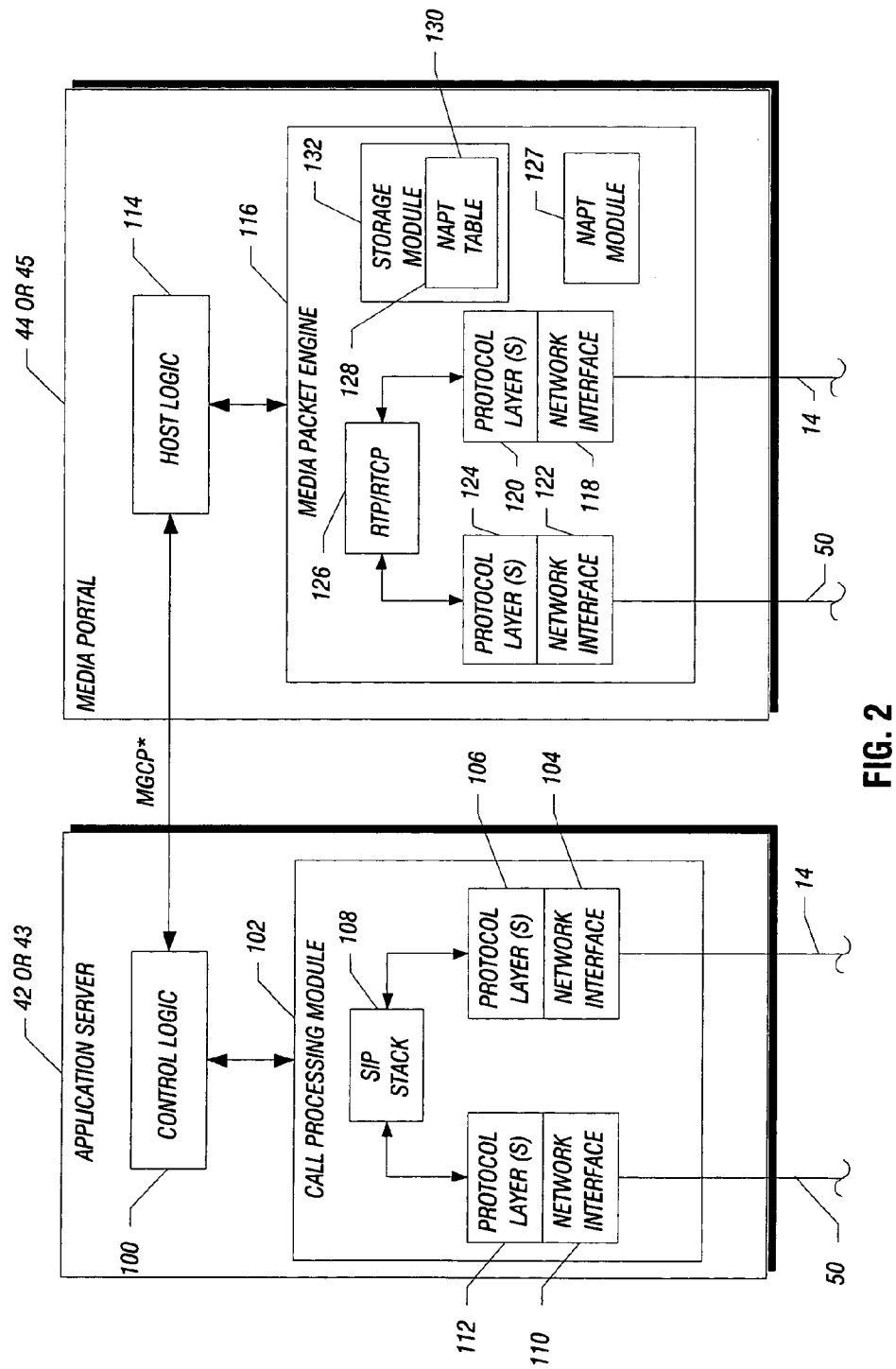
FIG. 2 is a block diagram of components of an application server and a media portal, in accordance with an embodiment.

Referring to FIG. 2, components of the application server 42 or 43 and the media portal 44 or 45 are illustrated. The application server 42 or 43 includes control logic 100 and a call processing module 102. The call processing module 102 receives call control signaling from the public network 14 and the private network 50. The call processing module 102 includes a network interface 104 to the public network 14, one or more protocol layers 106 above the network interface 104, and a SIP stack 108 for processing SIP messages. In one embodiment, the protocol layers 106 include a UDP transport layer and an IP network layer.

The call processing module 102 also includes a second network interface 110 coupled to the private network 50, and one or more protocol layers 112 above the network interface 110.

The control logic 100 of the application server 42 or 43 communicates with host logic 114 in the media portal 44. The control logic 100 and host logic 114, which can be implemented in software or a combination of software and hardware, employ a predefined messaging scheme to exchange messages with each other. In one example, the messaging scheme is according to an enhanced version of the Media Gateway Control Protocol (MGCP), as described in RFC 2705, entitled "Media Gateway Control Protocol (MGCP), Version 1.0," dated October 1999. Enhancements to the MGCP messages are added to support transport of certain types of data between the media portal 44 or 45 and the application server 42 or 43. The enhancements include the introduction of a new format of a parameter EndpointId used to identify endpoints and a parameter (referred to as X+NAPTAddressType) to specify the type of network mapping. Such enhancements are explained below.

The media portal 44 or 45 also includes a media packet engine 116. In one embodiment, the media packet engine 116 can be implemented on multiple circuit boards or blades (each with two interfaces to the public and private networks 14 and 50) to enhance concurrent communication of messages. The media packet engine 116 includes a first network interface 118 coupled to the public network 14, and one or more protocol layers 120 above the network interface 118. Similarly, a second network interface 122 is coupled to the private network 50, and one or more protocol layers 124 are provided above the network interface 122. An RTP/RTCP module 126 is also part of the media packet engine 116. RTP, which provides a mechanism for transporting real-time data across a packet-based network, is an application sublayer that typically runs on top of the UDP layer (which is part of the protocol layers 120 or 124). Specified along RTP is the Real-Time Control Protocol (RTCP), which provides a mechanism for sharing various session data between endpoints. In accordance with one embodiment, voice and other forms of real-time data are carried in RTP packets communicated across the public network 14 and the private network 50.

Also included in the media packet engine 116 is an NAPT module 127 and an NAPT table 128 that contains plural entries 130. Each entry of the NAPT table 128 contains mapping information for source and destination addresses and ports of media packets received from the networks 14 and 50. For a given call session involving a first device and a second device, each NAPT table entry includes a first address and port of the first device, a second address and port of the second device, a first alias address and port mapped to the first device address and port, and a second alias address and port mapped to the second device address and port. The contents of each NAPT table entry are discussed further below. The NAPT table entry is dynamically updated as a call session is being established. Once the call session is terminated, the allocated resources in the NAPT table entry are deleted and made available to other call sessions.

The NAPT table 128 is stored in a storage module 132. The NAPT module 127 uses information in the NAPT table 128 to perform network address and port translations.

Figure 3:
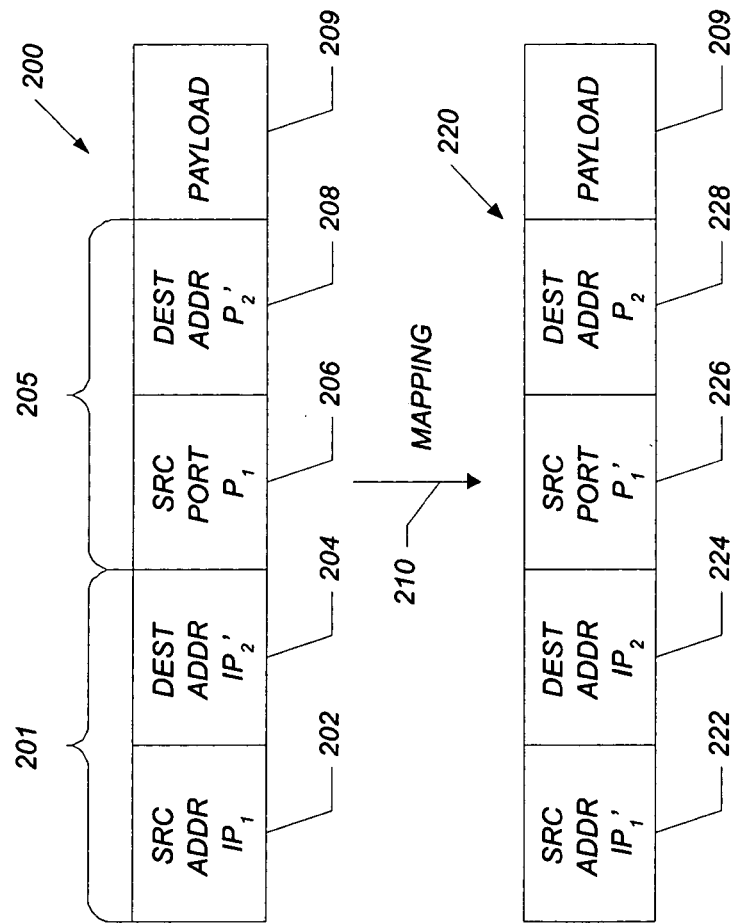
FIG. 3 illustrates mapping of source and destination addresses and ports in a media packet by the media portal.

Referring to FIG. 3, the network address and port translation performed in the media portal 44 or 45 according to an embodiment is illustrated. A received IP packet 200 contains a payload section 209 (which includes the RTP packet), an IP header 201, and a UDP header 205. The IP header 201 contains a source network address 202 and a destination network address 204, in addition to other information. The UDP header 205 contains a source port 206, a destination port 208, and other information. The IP packet 200 is applied (at 210) through NAPT mapping based on the NAPT table 128. The output packet 220, after the NAPT mapping, includes the same payload 209, but the source and destination addresses and source and destination ports have been translated. The source network addresses 222 has been translated from IP address $IP_1$ to IP address $IP_1'$, the destination address 224 has been translated from $IP_2'$ to $IP_2$, the source port 226 has been translated from port $P_1$ to port $P_1'$, and the destination port 228 has been translated from port $P_2'$ to port $P_2$.

Thus, from the perspective of each endpoint, the media portal 44 or 45 is the node that each endpoint is communicating with. In effect, the media portal 44 or 45 masquerades as the endpoint in a call session that each of the two "real" endpoints is communicating with. As noted above, the media portal 44 or 45 resides in the media path of a call session for communicating media packets containing bearer traffic. Note that if one of the endpoints is behind an enterprise firewall and NAPT module, then the NAPT mapping in the media portal 44 or 45 is not completed until the endpoint behind the enterprise firewall and NAPT module sends its first media packet.

In the control path, the application server 42 or 43 serves as the SIP proxy for one or more of the user stations 22 or 24 and other devices (e.g., the gateway 36) that are capable of participating in call sessions. Thus, as each user station 22 or 24 or other device is started, the user station 22 or 24 or other device performs SIP registration with the application server 42 or 43.

Figure 4:
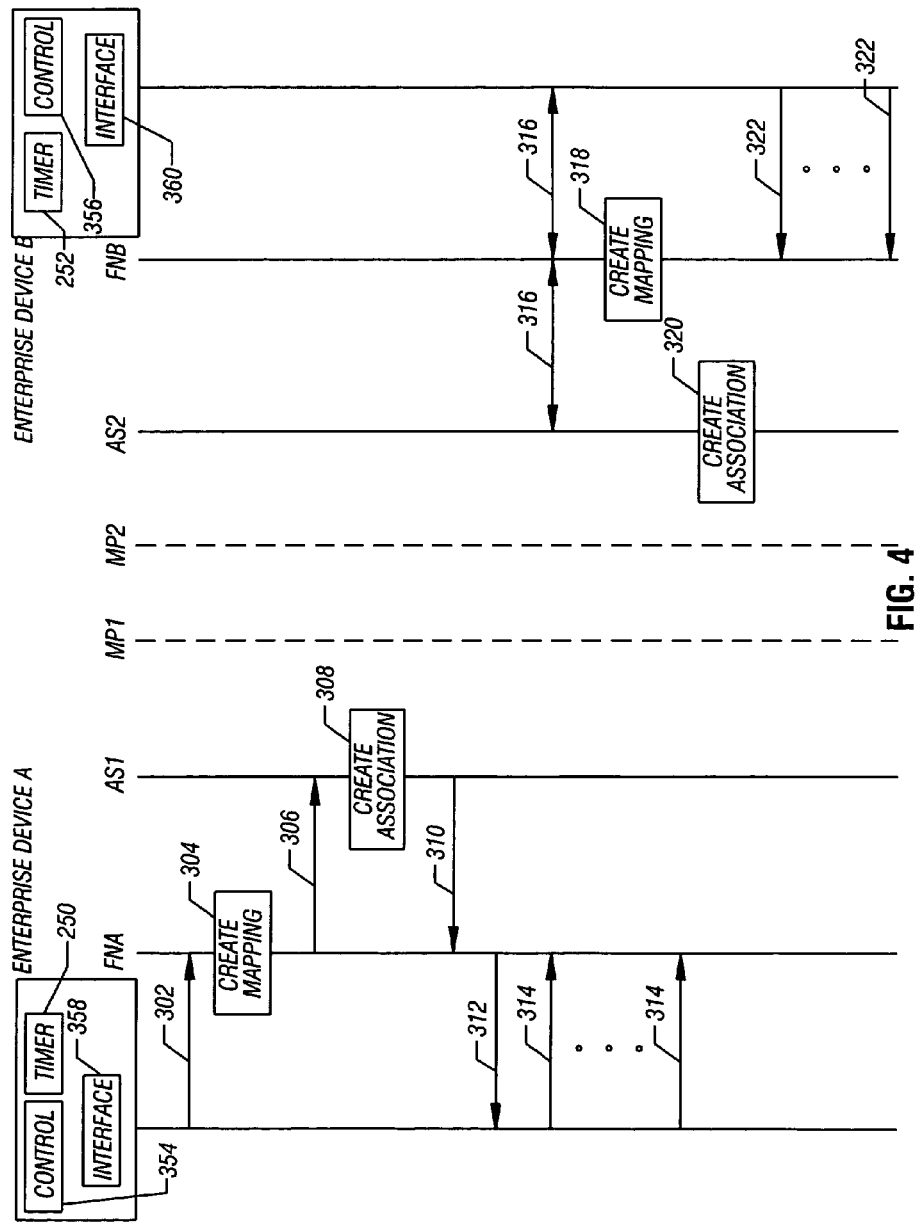
FIG. 4 is a message flow diagram of a registration procedure by a device behind a firewall and network address and port translation (NAPT) module, in accordance with an embodiment.

FIG. 4 shows an example registration procedure that involves a first pair of application server and media portal (42 and 44), a second pair of application server and media portal (43 and 45), a first firewall and NAPT module FNA, a second firewall and NAPT module FNB, and devices A and B. Device A resides behind the firewall and NAPT module FNA (such as in a first border system, e.g., 28 in FIG. 1), while device B resides behind the second firewall and NAPT module FNB (e.g., in another border system). As illustrated, device A sends (at 302) a SIP REGISTER message to the first application server 42, with the SIP REGISTER containing the following according to one example:

```
IP Header:
src = 10.1.1.1
dst = 147.3.3.3
UDP Header:
src port = 5060
dst port = 5060
Payload:
SIP REGISTER
From: A@xxx.com
...
["NAPT Active" flag*]
```

The SIP REGISTER packet includes an IP header containing source and destination IP addresses, a UDP header containing source and destination UDP ports, and a payload. The source network address and port (e.g., 10.1.1.1:5060), which is a private address that has meaning only on the enterprise private network 26, identifies device A, while the destination network address and port (e.g., 147.3.3.3:5060), which is a public address, identifies the first application server 42. The payload of the SIP REGISTER message indicates that the registration is being attempted from device A (having identifier A@xxx.com). In addition, the payload has an NAPT Active flag, which indicates that the message is from a device that is subject to enterprise NAPT (which allocates a public address for device A). In one embodiment, the NAPT Active flag is inserted into the SIP REGISTER message payload by the device A. This flag is used to indicate special handling at the application server.

The SIP REGISTER message is routed through the firewall and NAPT module FNA, which creates a mapping (at 304) between the source address and port $A_{internal}$ (of the device A) and an available external address and port $A_{public}$ (allocated by the firewall and NAPT module FNA). This mapping is maintained by the firewall and NAPT module FNA to provide a path for responses to flow back to device A. Conventionally, the mapping is removed after a configured time interval passes. However, as explained below, the mapping is maintained by a keep-alive signaling mechanism to allow a signaling path between device A and the application server 42 through the firewall and NAPT module FNA.

The firewall and NAPT module FNA forwards (at 306) the SIP REGISTER message to the first application server 42. The SIP REGISTER message remains the same, except the source network address and port $A_{internal}$ in the IP and UDP headers in the REGISTER message has been replaced with $A_{public}$. Upon receipt of the SIP REGISTER message, the first application server 42 determines that the NAPT Active flag has been set and creates (at 308) an association between A@xxx.com and the From: address ($A_{public}$) in the packet. This is contrasted to the standard process of mapping A@xxx.com to the SIP REGISTER Contact: Address. If needed, the application server 42 creates or updates a profile associated with the registering device in the database server 48.

The first application server 42 then responds (at 310) with a SIP 200 OK message. This message is sent to the enterprise NAPT address ($A_{public}$), not the "real" address ($A_{internal}$) of device A, since the "real" address is a private address and cannot be properly routed on the public network. The SIP 200 OK message has the following content according to one example:

IP Header:
src = 147.3.3.3
dst = 47.2.2.2
UDP Header:
src port = 5060
dst port = 6000
Payload:
SIP 200 OK The SIP 200 OK message routes to the enterprise firewall and NAPT module FNA for xxx.com, where the public destination address ($A_{public}$ or 47.2.2.2:6000) is mapped to the internal address and port ($A_{internal}$) of the originating terminal. The IP/UDP headers of the packet containing the SIP 200 OK message are modified, and the modified packet is sent by the enterprise firewall and NAPT module FNA (at 312) to device A. The modified SIP 200 OK message is the same as the original SIP 200 OK message except the destination network address and port in the IP and UDP headers of the OK message has been changed from $A_{public}$ to $A_{internal}$. The device A receives the SIP 200 OK message as confirmation that the registration was successful.

At this point, a two-way signaling path exists between device A and the application server 42 through the firewall and NAPT module FNA. The firewall and NAPT module FNA includes a timer that when expired causes the signaling path between the device A and application server 42 to be closed (which results from the NAPT mapping in the application server 42 being removed).

To maintain the signaling path active, device A periodically transmits (at 314) a "keep-alive" message through the enterprise firewall and NAPT module FNA to maintain the mapping of the SIP signaling addresses for the duration of the registration. In one example, the keep-alive message is a SIP PING message. In other embodiments, other types of keep-alive messages can be used. The SIP PING message, which contains the source address and port of device A and the destination address and port of the application server 42, causes the timer in the firewall and NAPT module FNA to reset and start a new count-down, thereby enabling the allocation of mapping resources and thus the signaling path through the firewall and NAPT module FNA. In another embodiment, the keep-alive messages are initiated by a network server (e.g., the application server 42 or some other network node) rather than device A.

The timing of the keep-alive messages is controlled by a timer 350 in device A. The timer 350 can be configured to count a predetermined time period after which the keep-alive message is transmitted. Enterprise device A also includes a control module 354 (implemented in software and/or hardware) that provides control tasks (e.g., exchanging call control signaling and communicating media traffic) for the enterprise device A. The enterprise device A also includes an interface 358 that enables communications over data networks.

Device B, which is in a separate enterprise private network associated with firewall and NAPT module FNB, performs a similar registration process (at 316) with the second application server 43. A mapping is created (at 318) by the enterprise firewall and NAPT module FNB between the internal network address and port ($B_{internal}$) and an external or public network address and port ($B_{public}$). The second application server 43 also creates (at 320) an association between B@yyy.com and the external network address and port $B_{public}$ that the message came from. To maintain the SIP signaling path open, enterprise terminal B also periodically sends (at 322) keep-alive messages.

Enterprise B includes a timer 352, control module 356, and an interface 360 that are similar to respective components in enterprise A. In the above example, the enterprise devices A and B contain timers to enable them to send keep-alive messages. However, in an alternative embodiment, the application server 42 or 43 can include the timer and logic to send keep-alive messages to the enterprise devices A and B.

Thus, a SIP registration process is provided that enables a signaling path to be maintained between an enterprise device and a SIP proxy (the application server 42 or 43) through an enterprise firewall and NAPT module (FNA or FNB) for the duration of a given SIP registration, without requiring that the enterprise firewall and NAPT module be aware of SIP. This is referred to as a "transparent firewall" functionality. However, although a constant signaling is established for the enterprise device in the registration process, the same is not true of the media path. The media path actually changes on a per-session basis. This is due to the fact that the enterprise firewall and NAPT module dynamically assigns mappings as required from its currently available pool of resources. An implication of this is that the enterprise firewall and NAPT module only sets up the mapping upon receipt of a media packet, which happens to occur after call setup has been completed and media packets are actually communicated.

The above example assumes that the enterprise devices A and B are SIP-enabled (that is, they are capable of exchanging SIP messages). However, in some cases, the enterprise device A or B may not be SIP-enabled. An example of such a device is the i2004 network telephone, which cooperates with a network telephone manager (e.g., the network telephone manager 40 in FIG. 1). In this alternative arrangement, the enterprise device A or B sends a "ResumeConnection" message (instead of a SIP REGISTER message) to the network telephone manager 40 through the firewall and NAPT module. A signaling path through the firewall and NAPT module is established between the enterprise device and network telephone manager 40. The SIP registration process for the enterprise device A or B can occur between the network telephone manager 40 and application server 42 or 43 over the service provider private network 50.

Maintenance of the signaling path in this alternative embodiment between the enterprise device and the network telephone manager 40 is similarly accomplished by using a timer in the network telephone manager 40, which periodically sends a message (based on the timer) to the enterprise device A or B. The enterprise device A or B acknowledges the message, thereby keeping the signaling path open. Again, the enterprise firewall and NAPT module need not be aware of the telephony protocol used between the network telephone manager 40 and the enterprise device A or B.

Figure 5:
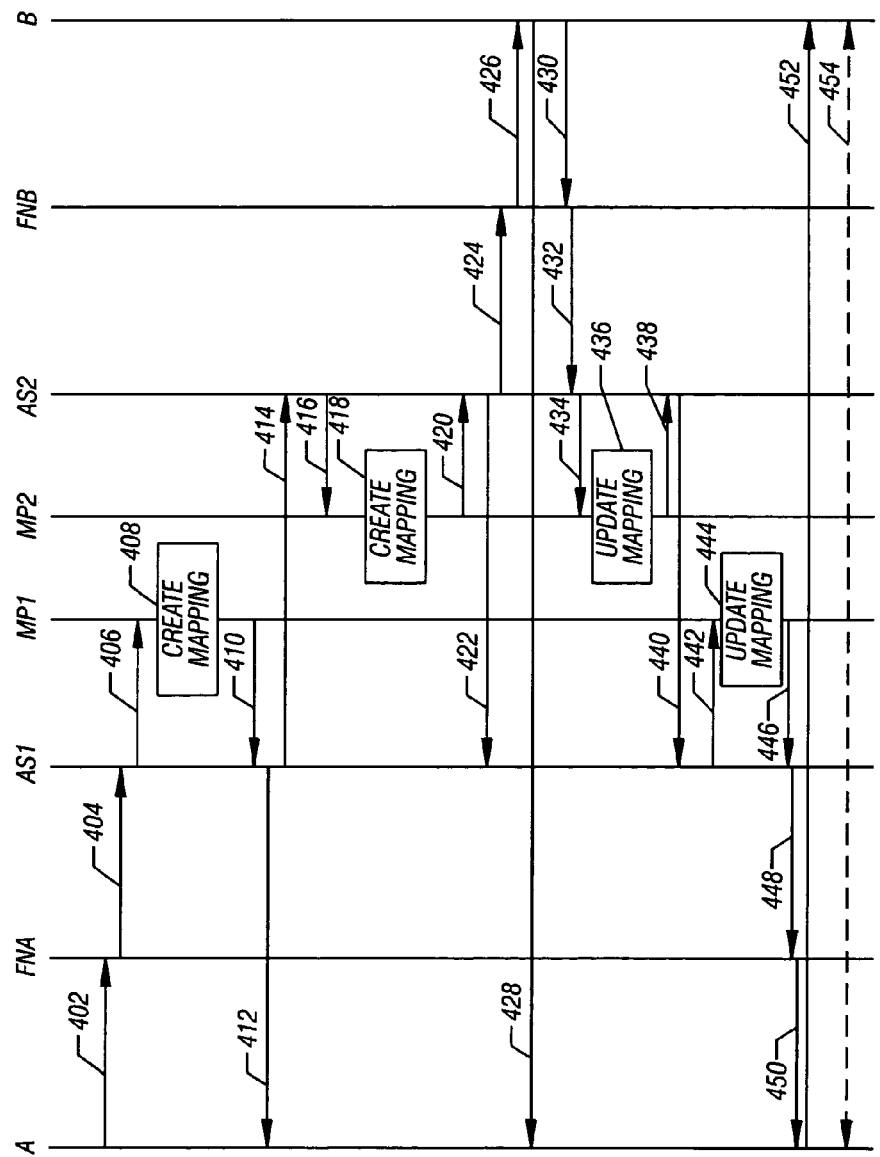
FIG. 5 is a message flow diagram of a call setup procedure between devices behind respective firewall and NAPT modules, in accordance with an embodiment.

Referring to FIG. 5, a call setup process is illustrated, in which NAPT mappings are established for enterprise devices A and B that reside behind respective firewall and NAPT modules FNA and FNB. In the example of FIG. 5, enterprise device A is the one that initiates the call session. Enterprise device A does this by sending (at 402) a call request (e.g., a SIP INVITE message) to the first application server 42 through the enterprise firewall and NAPT module FNA. The firewall and NAPT module FNA locates the associated mapping between the internal source address and port ($A_{internal}$) and the assigned external address and port ($A_{public}$). This mapping was established when enterprise device A initially registered for service with the first application server 42 (see FIG. 4), which has been maintained through the use of periodic keep-alive messages.

An example SIP INVITE message is shown below:

```
IP Header:
src = 10.1.1.1
dst = 147.3.3.3
UDP Header:
src port = 5060
dst port = 5060
Payload:
SIP INVITE
From: A@xxx.com
To: B@yyy.com
SDP: RTP/RTCP 10.1.1.1:1000
```

The source address and port $A_{internal}$ (10.1.1.1:5060) specifies enterprise device A, while the destination network address and port (147.3.3.3:5060) specifies an address and port of the first application server 42. The payload section of the IP packet contains a SIP INVITE message, which contains a From: address, e.g., A@xxx.com (identifying enterprise device A), and a To: address, e.g., B@yyy.com (identifying enterprise device B). The SDP portion of the SIP INVITE message specifies the media network address and port ($A_{media\_internal}$, which in the example is 10.1.1.1:1000) where device A desires to receive media packets. $A_{media\_internal}$ is port a private address and port used by the enterprise device A for communicating media packets. Note that $A_{media\_internal}$ for media packet communications is different from $A_{internal}$ for control signaling communications with the enterprise device A.

The firewall and NAPT module FNA substitutes $A_{private}$ (the source address and port in the IP and UDP headers of the packet containing the INVITE message) with $A_{public}$, and forwards the modified packet containing the SIP INVITE message (at 404) to the first application server 42.

Upon receiving the SIP INVITE message, the first application server 42 locates the application server for the yyy.com domain (of enterprise device B), and engages the first media portal 44 to prepare NAPT mappings for the call session that is to be established. The application server 42 sends (at 406) a message to the media portal 44 to create the NAPT mapping information (in the form of an entry in the mapping table 128). In one embodiment, the request includes an MGCP CreateConnection message, with one example provided below:

```
CRCX 1234 A:0000@0.0.0.0 MGCP 0.1
C: 987651
M: recvonly
X+NAPTAddressType: ON:INT, TN:EXT
MGCPVerb = CRCX (CreateConnection)
TransactionId = 1234
EndpointId = A:0000@0.0.0.0
MGCPVersion = 0.1
CallId = 987651
ConnectionMode = recvonly (receive only)
NAPTAddressType = ON:INT, TN:EXT
```

One pertinent field of the CreateConnection message is the parameter EndpointId, which is equated to A:0000@0.0.0.0 (a dummy address), where A represents audio. For video or other media, other indicators are used. The dummy address is used as an indicator that the address should be filled in later. The EndpointId parameter, which is a parameter whose format has been altered from the standard MGCP-defined EndpointId as an enhancement, identifies the address and port that the media portal 44 is to allocate resources for. The example provided above (and elsewhere in this description) is a relatively simple implementation of EndpointId. Other fuller implementations include providing a larger part of the media description that is in the SDP portion of the INVITE or other SIP message). Also, a CallId parameter is supplied in the MGCP CreateConnection message. The CallId parameter is used as a key to point to an entry in the NAPT mapping table 128.

Another parameter in the MGCP CreateConnection message is a parameter X+NAPTAddressType to identify the different types (internal or external) of endpoints. The X+NAPTAddressType parameter is also added to the MGCP CreateConnection request as an enhancement. From the perspective of the media portal 44 in the example above, the address and port of the media portal 44 interfacing the originating endpoint, which is the enterprise device A (through the enterprise firewall and NAPT module FNA), is a public address and port (referred to as $B_{media}"$). The address and port of the media portal 44 interfacing the terminating endpoint, which is the second media portal 45, is a private address and port (referred to as $A_{media}'$) on the service provider private network 50. Thus, the X+NAPTAddressType parameter is used to assign the appropriate public and private NAPT addresses and ports in the media portal 44.

The first application server 42 uses the X+NAPTAddressType parameter to inform the first media portal 44 to allocate a public NAPT address and port ($B_{media}"$ or TN) to interface the originating endpoint (enterprise device A through the enterprise firewall and NAPT module FNA), and to allocate a private NAPT address and port ($A_{media}'$ or ON) to interface the terminating endpoint (media portal 45). TN is the address and port at the media portal 44 or 45 that represents the terminating endpoint to the originating endpoint, while ON is the address and port at the media portal 44 or 45 that represents the originating endpoint to the terminating endpoint. In this example, media packets are exchanged between $A_{media}$ (at the enterprise firewall and NAPT module FNA) and $B_{media}"$ (at the media portal 44); and media packets are exchanged between $B_{media}'$ (at the second media portal 45) and $A_{media}'$ (at the first media portal 44). When a media packet is received by the media portal 44, $A_{media}$ is mapped to $A_{media}'$ while $B_{media}'$ is mapped to $B_{media}"$.

In response to the MGCP CreateConnection request above, the media portal 44 reserves NAPT resources (at 408) for communications of media packets in the call session. However, at this point, the first media portal 44 is unable to build a complete mapping of the address and port space. The reason for this is that the address and port supplied in the SDP of the SIP INVITE is enterprise device A's private address ($A_{media\_internal}$), which is not accessible from the outside world. Therefore, a dummy address and port is used to indicate this special case (e.g., 0.0.0.0:0000) using the EndpointId parameter in the MGCP CreateConnection message.

The first media portal 44 reserves two available NAPT network addresses and ports: the originating NAPT address and port ($A_{media}'$) and the terminating NAPT address and port ($B_{media}"$). However, the originating endpoint network address and port ($A_{media}$) is not known at this point, nor is the terminating endpoint network address and port ($B_{media}'$). The mapping table entry at this point is shown below:

| CallId | OrigEndpoint ($A_{media}$) | OrigNAPTAddr ($A_{media}'$) | TermNAPTAddr ($B_{media}"$) | TermEndpoint ($B_{media}'$) |
|---|---|---|---|---|
| 987651 | A:0000@0.0.0.0 | A:4000@192.168.4.4 | A:4000@147.4.4.4 | ??? |

The mapping table entry is pointed to by the CallId parameter, which is used as a key.

Next, the first media portal 44 returns (at 410) the originating NAPT address and port ($A_{media}'$) to the first application server 42. The first application server 42 also responds (at 412) to enterprise device A with a SIP 100 TRYING. Note that the TRYING message is likely to have been communicated earlier (for example, right after the application server 42 receives the SIP INVITE message at 404).

Next, the first application server 42 performs a substitution of $A_{media\_internal}$ with $A_{media}'$ in the SDP portion of the SIP INVITE message. The modified SIP INVITE message is sent (at 414) to the second application server 43.

When the modified SIP INVITE message arrives at the second application server 43, the second application server 43 locates B@yyy.com and engages the second media portal 45 to reserve NAPT resources. This is accomplished by sending (at 416) an MGCP CreateConnection message to the second media portal 45. From the perspective of the second media portal 45, the originating endpoint ($A_{media}'$) is the first media portal 44, which is on the service provider private network 50. The terminating endpoint ($B_{media\_internal}$) is behind a firewall and NAPT module FNB served by the second application server 43. The firewall and NAPT module FNB dynamically maps $B_{media\_internal}$ to an external network address and port $B_{media}$.

The network connection between the second media portal 45 and $A_{media}'$ is a private network connection (on private network 50), while the network connection between the media portal 45 and $B_{media}$ is a public network connection. The second application server 43 uses the X+NAPTAddressType parameter in the CreateConnection message to inform the second media portal 45 to allocate respective NAPT (external and internal) addresses and ports to each endpoint. In this example, the originating endpoint ($A_{media}'$) is an internal network address, so the NAPT address $B_{media}'$ or TN of the second media portal 45 that communicates with $A_{media}'$ is assigned as an internal address. The terminating endpoint $B_{media}$ is an external public network address, so the NAPT address $A_{media}"$ or ON of the second media portal 45 that communicates with $B_{media}$ is assigned as an external address.

The MGCP CreateConnection message sent at 416 according to one example is as follows:

```
CRCX 1234 A:4000@192.168.4.4 MGCP 0.1
C: 987651
M: recvonly
X+NAPTAddressType: ON:EXT, TN:INT
MGCPVerb = CRCX (CreateConnection
TransactionId = 1234
EndpointId = A:4000@192.168.4.4
MGCPVersion = 0.1
```

-continued

```
CallId = 987651
ConnectionMode = recvonly (receive only)
NAPTAddressType = ON:EXT, TN:INT
```

The second media portal 45 reserves (at 418) two available addresses and ports: originating NAPT network address and port ($A_{media}''$) and terminating NAPT address and port ($B_{media}'$). The created partial table entry is as follows:

| CallId | OrigEndpoint ($A_{media}'$) | OrigNAPTAddr ($A_{media}''$) | TermNAPTAddr ($B_{media}'$) | TermEndpoint ($B_{media}$) |
|---|---|---|---|---|
| 987651 | A:4000@192.168.4.4 | A:2020@161.6.6.6 | A:3300@192.168.6.6 | ??? |

The table above specifies a mapping between $A_{media}'$ and $A_{media}''$, and a mapping between $B_{media}'$ and $B_{media}''$. The second media portal 45 returns (at 420) the originating NAPT address and port ($A_{media}''$) to the second application server 43. The second application server 43 then responds (at 422) to the first application server 42 with a SIP 100 TRYING message.

The second application server 43 modifies the SIP INVITE message and forwards it (at 424) to enterprise device B through the firewall and NAPT module FNB. The second application server 43 modifies the SIP INVITE message by changing the SDP portion to substitute $A_{media}'$ with $A_{media}''$.

The firewall and NAPT module FNB performs another address and port translation, in which the destination address and port $B_{public}$ in the IP and UDP headers of the SIP INVITE message is changed to $B_{internal}$. The modified packet containing the SIP INVITE message is then forwarded (at 426) to enterprise device B.

Enterprise device B then signals the originating terminal with a SIP 180 RINGING message. This is propagated (at 428) all the way back to enterprise device A through various intermediaries. When enterprise device B answers, it sends a SIP 200 OK message (at 430) to the second application server 43.

The SIP 200 OK message according to one example includes the following:

```
IP Header:
src = 10.5.5.5
dst = 161.4.4.4
UDP Header:
src port = 5060
dst port = 5060
Payload:
SIP 200 OK
From: B@yyy.com
To: A@xxx.com
SDP: RTP/RTCP 10.5.5.5:2000
```

The SDP portion of the SIP 200 OK message contains the source network address and port ($B_{media\_internal}$) of enterprise device B for media communications where device B desires to receive media packets. However, because this address and port is private, it cannot be used by external devices for communication with the enterprise device B.

Upon receiving the SIP 200 OK message, the firewall and NAPT module FNB locates the associated mapping between the source address and port $B_{internal}$ for device B and the assigned external address and port $B_{public}$. This mapping was established as part of the registration procedure described above, and maintained through the use of the keep-alive messages. The firewall and NAPT module FNB substitutes the source address and port in the IP and UDP headers of the SIP 200 OK message (replacing $B_{internal}$ with $B_{public}$), and forwards (at 432) the message to the second application server 43. When the second application server 43 receives the SIP 200 OK message, it sends a ModifyConnection request (at 434) to the second media portal 45.

Since enterprise device B is configured behind the enterprise firewall and NAPT module FNB, the actual media address and port for enterprise device B will not be known until the enterprise device B transmits its first media packet through the enterprise firewall and NAPT module FNB. Thus, the address and port $B_{media\_internal}$ in the SDP portion of the SIP 200 OK message is discarded, and a "dummy" address (e.g., 0.0.0.0:0000) is used. The MGCP ModifyConnection request in one example is shown below:

```
MDCX 1237 A:0000@0.0.0.0 MGCP 0.1
C: 987651
M: sendrecv
MGCPVerb = MDCX (ModifyConnection)
TransactionId = 1237
EndpointId = A:0000@0.0.0.0
MGCPVersion = 0.1
CallId = 987651
ConnectionMode = sendrecv (send and receive)
```

Using the CallId parameter as a key, a mapping table entry is identified (at 436), and the TermEndpoint parameter is filled with 0000@0.0.0.0. At this point, the second media portal 45 is not able to perform the NAPT function yet since it does not have the complete mapping information.

The second media portal 45 then returns (at 438) the terminating NAPT address and port ($B_{media}'$) in an MGCP response to the second application server 43. The second application server 43 substitutes (in the SDP portion of the SIP 200 OK message) address $B_{media\_internal}$ with $B_{media}'$, and forwards the SIP 200 OK message (at 440) to the first application server 42.

In response to the SIP 200 OK message, the first application server 42 sends a ModifyConnection request (at 442) to the first media portal 44 to allocate the necessary NAPT address and port resources. The contents of the MGCP ModifyConnection request is as follows:

```
MDCX 1237 A:3300@192.168.6.6 MGCP 0.1
C: 987651
M: sendrecv
MGCPVerb = MDCX (ModifyConnection)
TransactionId = 1237
EndpointId = A:3300@192.168.6.6
MGCPVersion = 0.1
CallId = 987651
ConnectionMode = sendrecv (send and receive)
```

The first media portal 44 uses the CallId parameter as a key to find the mapping resources and fills (at 444) in the TermEndpoint field with address $B_{media}'$. The updated mapping table entry is as follows:

| CallId | OrigEndpoint ($A_{media}$) | OrigNAPTAddr ($A_{media}'$) | TermNAPTAddr ($B_{media}''$) | TermEndpoint ($B_{media}'$) |
|---|---|---|---|---|
| 987651 | A:0000@0.0.0.0 | A:4000@192.168.4.4 | A:4000@147.4.4.4 | 3300@192.168.6.6 |

However, the first media portal 44 is still not yet able to perform NAPT translations since the OrigEndpoint address and port are still not known at this point (filled with the dummy address).

The first media portal 44 then returns (at 446) the terminating NAPT address and port in an MGCP response. The first application server 42 substitutes (in the SDP portion of the SIP 200 OK message) the address $B_{media}'$ with $B_{media}''$. The first application server 42 sends (at 448) the modified SIP 200 OK message to enterprise device A through the firewall and NAPT module FNA. The firewall and NAPT module FNA locates the associated mapping between the assigned external address and port of the enterprise terminal A ($A_{public}$) and the internal address and port ($A_{internal}$) for enterprise device A and substitutes the information in the destination address and port fields in the IP and UDP headers of the SIP 200 OK message (replacing $A_{public}$ with $A_{internal}$). The modified SIP 200 OK message is sent (at 450) from the firewall and NAPT module FNA to the enterprise device A.

Enterprise device A responds (at 452) with a SIP ACK message, which is propagated through the various devices back to enterprise device B. At this point, a media session is established (at 454) between enterprise device A and enterprise device B through the first and second firewall and NAPT modules FNA and the first and second media portal 44 and 45. Note that the NAPT mappings in the first and second media portals at this point are still not fully established. The media portals 44 and 45 await transmission of media packets from respective enterprise devices A and B to complete the NAPT mappings.

Figure 6:
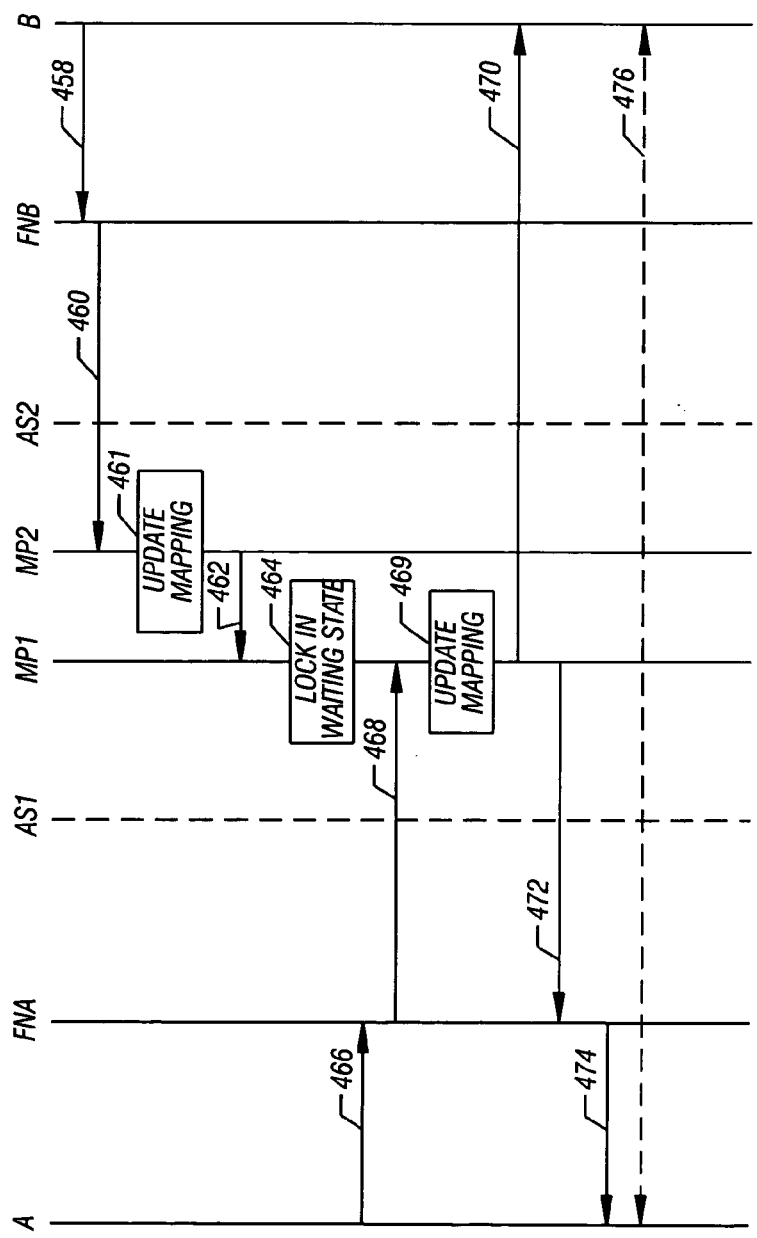
FIG. 6 is a message flow diagram of a process of updating NAPT tables in respective media portals in response to communication of media packets by the devices of FIG. 5.

Referring to FIG. 6, according to one example after call setup (FIG. 5), enterprise device B is the first to send a media packet. The media packet is sent (at 458) from the enterprise device B to the second media portal 45 through the firewall and NAPT module FNB. The media packet contains the following information:

IP Header:
src = 10.5.5.5
dst = 161.6.6.6
UDP Header:
src port = 2000
dst port = 2020
Payload:
[RTP packet]

The firewall and NAPT module FNB does not have a mapping for the communication of media packets, so FNB creates a mapping between the private media source address and port $B_{media\_internal}$ of the packet and an available external address and port $B_{media}$. The source address and port $B_{media\_internal}$ of the media packet is replaced with the external address and port $B_{media}$, and now contains the following information:

IP Header:
src = 61.3.3.3
dst = 161.6.6.6
UDP Header:
src port = 7070
dst port = 2020
Payload:
[RTP packet]

The modified media packet is sent (at 460) to the second media portal 45. When the second media portal 45 receives the packet, the second media portal 45 fills (at 461) the TermEndpoint field with the source address and port information $B_{media}$ from the media packet. The mapping table entry now looks as follows:

| CallId | OrigEndpoint ($A_{media}'$) | OrigNAPTAddr ($A_{media}''$) | TermNAPTAddr ($B_{media}'$) | TermEndpoint ($B_{media}$) |
|---|---|---|---|---|
| 987651 | A:4000@192.168.4.4 | A:2020@161.6.6.6 | A:3300@192.168.6.6 | A:7070@61.3.3 |

The second media portal 45 consults the mapping table entry and performs a substitution of both the source and destination network addresses and ports, and sends the modified media packet (at 462) to the first media portal 44.

However, the NAPT mapping information is not fully established in the first media portal 44 for the media session between enterprise devices A and B, assuming that a media packet has not been received yet from enterprise device A. Thus, the first media portal 44 is locked (at 464) in this waiting state (discarding packets) until a media packet arrives from enterprise device A.

At some point, enterprise device A sends (at 466) a media packet to the first media portal 44 (through the firewall and NAPT module FNA). The media packet is as follows:

IP Header:
src = 10.1.1.1
dst = 147.4.4.4
UDP Header:
src port = 1000
dst port = 4000
Payload:
[RTP packet]

Since the firewall and NAPT module FNA does not have mappings for the session yet, it creates a mapping between the private media source address and port $A_{media\_internal}$ (e.g., 10.1.1.1:1000) for enterprise device A and an available external address and port $A_{media}$. The firewall and NAPT module FNA then substitutes the source address and port in the IP and UDP headers of the media packet, and sends the modified media packet (at 468) to the first media portal 44.

When the first media portal 44 receives the media packet from enterprise device A (really from the firewall and NAPT module FNA), the media portal 44 now has enough information to complete the mapping table entry for the media session. As a result, it accesses the OrigEndpoint information and replaces the dummy address 0.0.0.0:0000 with the source address and port $A_{media}$ of the media packet received from the firewall and NAPT module FNA. The mapped table entry in the first media portal 44 now looks as follows:

| CallId | OrigEndpoint ($A_{media}$) | OrigNAPTAddr ($A_{media}'$) | TermNAPTAddr ($B_{media}''$) | TermEndpoint ($B_{media}'$) |
|---|---|---|---|---|
| 987651 | A:6060@47.2.2.2 | A:4000@192.168.4.4 | A:4000@147.4.4.4 | A:3300@192.168.6.6 |

The first media portal 44 then modifies the source and destination network addresses and ports of the media packet and sends (at 470) the media packet through the second media portal 45 to enterprise device B.

Once the mapping table entry in the first media portal is completed, any packets originated by enterprise device B can be forwarded (at 472 and 474) through the firewall and NAPT module FNA to enterprise device A. At this point, bi-directional media flows can be performed (at 476) between enterprise devices A and B.

The various nodes and systems discussed each includes various software routines or modules. Such software routines or modules are executable on corresponding control units. Each control unit includes a microprocessor, a microcontroller, a processor card (including one or more microprocessors or microcontrollers), or other control or computing devices. As used here, a "controller" refers to a hardware component, software component, or a combination of the two. Although used in the singular sense, a "controller" can also refer to plural hardware components, plural software components, or a combination thereof.

The storage devices referred to in this discussion include one or more machine-readable storage media for storing data and instructions. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Instructions that make up the various software routines or modules in the various devices or systems are stored in respective storage devices. The instructions when executed by a respective control unit cause the corresponding node or system to perform programmed acts.

The instructions of the software routines or modules are loaded or transported to each node or system in one of many different ways. For example, code segments including instructions stored on floppy disks, CD or DVD media, a hard disk, or transported through a network interface card, modem, or other interface device are loaded into the device or system and executed as corresponding software routines or modules. In the loading or transport process, data signals that are embodied in carrier waves (transmitted over telephone lines, network lines, wireless links, cables, and the like) communicate the code segments, including instructions, to the device or system. Such carrier waves are in the form of electrical, optical, acoustical, electromagnetic, or other types of signals.

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for communications involving a first terminal coupled to a first side of a firewall and network address translator, the method comprising:

sending, by the first terminal, a first message identifying the first terminal to a node on a second side of the firewall and network address translator, the first message identifying the first terminal as available for a call session;

receiving, by the first terminal, a second message from the node, wherein the first message and the second message cause creation of a signalling connection through the firewall and network address translator and creation of a mapping between a first address of the first terminal and a second address of the first terminal, where the first address is an address assigned to the first terminal on the first side of the firewall and network address translator, and where the second address is an address assigned to the first terminal on the second side of the firewall and network address translator;

repeatedly sending keep-alive messages to maintain the mapping at the firewall and network address translator;

communicating messages, by the first terminal through the firewall and network address translator using the mapping maintained at the firewall and network address translator, to establish a first call communication session with a second terminal using a first call communication session connection; and exchanging media packets with the second terminal via the first call communication session connection.

2. The method of claim 1, wherein the keep-alive messages maintain the existing signalling connection through the firewall and network address translator to thereby maintain the mapping at the firewall and network address translator.

3. The method of claim 2, wherein communicating the messages, by the first terminal through the firewall and network address translator using the mapping maintained at the firewall and network address translator, to establish the first communication session with the second terminal using the first call communication session connection comprises communicating the messages with the node over the existing signalling connection maintained through the firewall and network address translator.

4. The method of claim 1, wherein the first call communication session connection is different from the existing signalling connection.

5. The method of claim 1, wherein the first call communication session is established under control of the node.

6. The method of claim 1, further comprising receiving a communication session request, by the first terminal, using the mapping maintained at the firewall and network address translator.

7. The method of claim 6, wherein the communication session request is received by the first terminal over the existing signalling connection.

8. The method of claim 1, wherein repeatedly sending the keep-alive messages to maintain the mapping at the firewall and network address translator comprises maintaining a timer and sending the keep-alive messages responsive to the timer.

9. The method of claim 8, wherein the timer is maintained at the first terminal and the keep-alive messages are sent from the first terminal.

10. The method of claim 8, wherein the keep-alive messages are sent to the node over the signalling connection.

11. The method of claim 1, wherein repeatedly sending the keep-alive messages comprises sending the keep-alive messages at regular periodic time intervals.

12. The method of claim 1, wherein the signalling connection comprises a Session Initiation Protocol (SIP) signalling connection between the first terminal and the node.

13. The method of claim 1, wherein sending the first message comprises sending a registration message to register the first terminal with the node.

14. The method of claim 13, wherein:
sending the registration message comprises sending a Session Initiation Protocol (SIP) REGISTER message; and
communicating the messages to establish the first call communication session comprises communicating a SIP INVITE message.

15. The method of claim 14, wherein sending the registration message comprises sending the registration message to a SIP proxy.

16. The method of claim 15, wherein the node comprises the SIP proxy.

17. The method of claim 1, wherein:
sending the first message and receiving the second message cause registration of the first terminal; and
repeatedly sending the keep-alive messages to maintain the mapping at the firewall and network address translator is performed for a duration of the registration of the first terminal.

18. The method of claim 1, wherein the mapping comprises a mapping between an internal address of the first terminal and an external address of the first terminal.

19. A method for communications involving a first terminal coupled to a first side of a firewall and network address translator, the method comprising:
sending, by the first terminal, a first message identifying the first terminal to a node on a second side of the firewall and network address translator, the first message identifying the first terminal as available for a call session;
receiving, by the first terminal, a second message from the node, wherein the first message and the second message cause creation of a signalling connection through the firewall and network address translator and creation of a mapping between a first address of the first terminal and a second address of the first terminal, where the first address is an address assigned to the first terminal on the first side of the firewall and network address translator, and where the second address is an address assigned to the first terminal on the second side of the firewall and network address translator;
communicating messages, by the first terminal through the firewall and network address translator using the mapping between the first address and the second address, to establish a first call communication session with a second terminal using a first call communication session connection; and
exchanging media packets with the second terminal via the first call communication session connection.

20. The method of claim 19, further comprising repeatedly sending keep-alive messages to maintain the mapping at the firewall and network address translator.

* * * * *